United States Patent [19]

Drake

[11] 4,144,978
[45] Mar. 20, 1979

[54] SUSPENSION SYSTEMS FOR VEHICLES
[75] Inventor: Ronald Drake, Wrenthorpe, England
[73] Assignee: Coventry Climax Limited, Coventry, England
[21] Appl. No.: 895,525
[22] Filed: Apr. 11, 1978
[51] Int. Cl.² ........................... B60S 9/12; B60P 7/08
[52] U.S. Cl. ..................................... 414/544; 280/6.1
[58] Field of Search ................... 214/75 G, 501, 670; 280/6 R, 6 H, 6.1, 6.11; 180/41

[56] References Cited
U.S. PATENT DOCUMENTS 2,687,311  8/1954  Nallinger ............................ 280/6.1
3,655,218  4/1972  Taylor ................................. 214/501

Primary Examiner—Philip Goodman
Attorney, Agent, or Firm—Brisebois & Kruger

[57] ABSTRACT

An industrial truck has at least one axle with a road wheel mounted on each end. Each end of the axle is coupled to a sub-frame which is in turn coupled to the truck chassis by a main suspension spring and by an elastomeric spring.

The sub-frame at one end of the axle is coupled to the axle by a pivot. The sub-frame at the other end of the axle is coupled to the axle by way of a strut whose length can be controllably varied.

9 Claims, 2 Drawing Figures

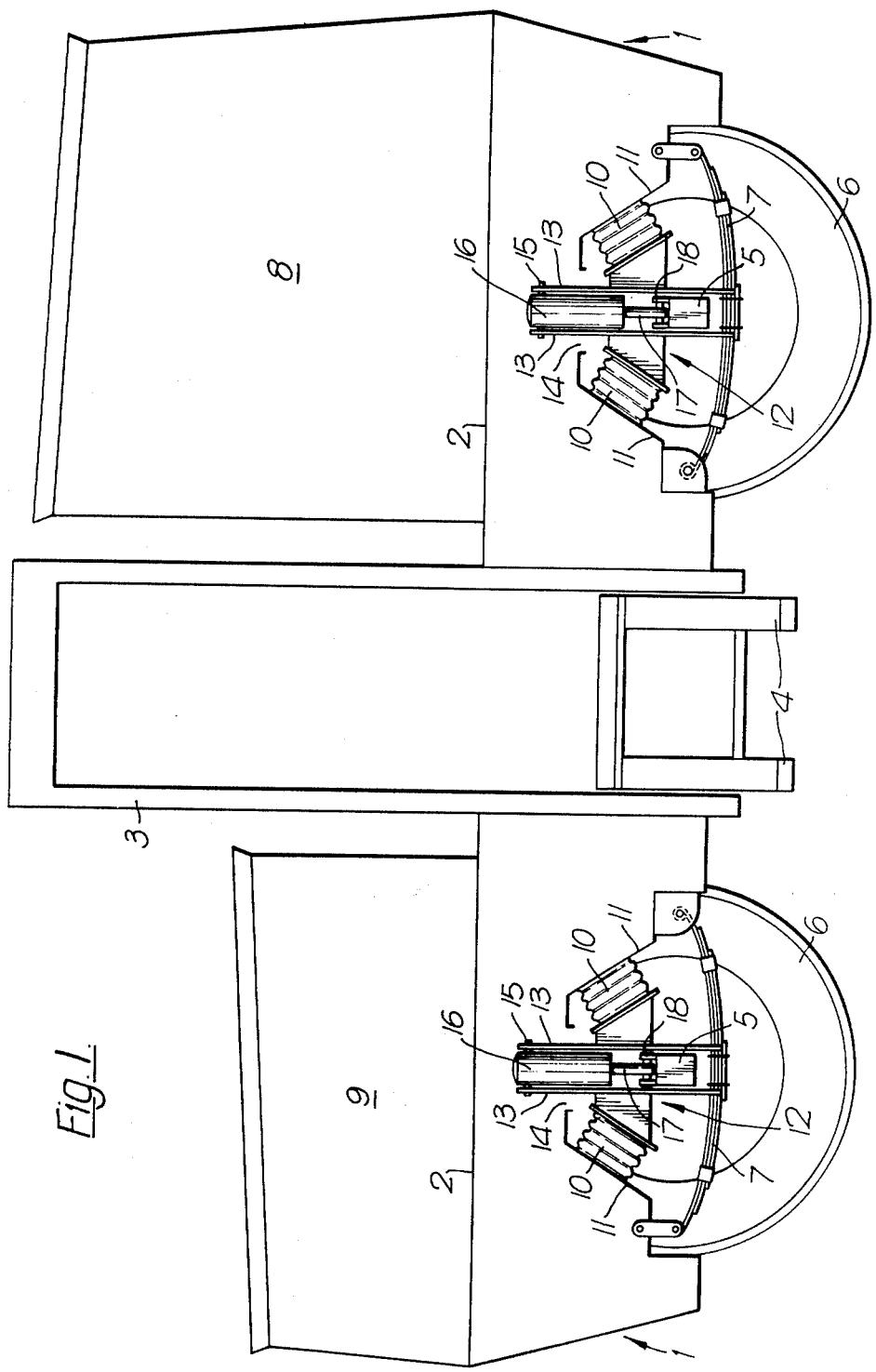

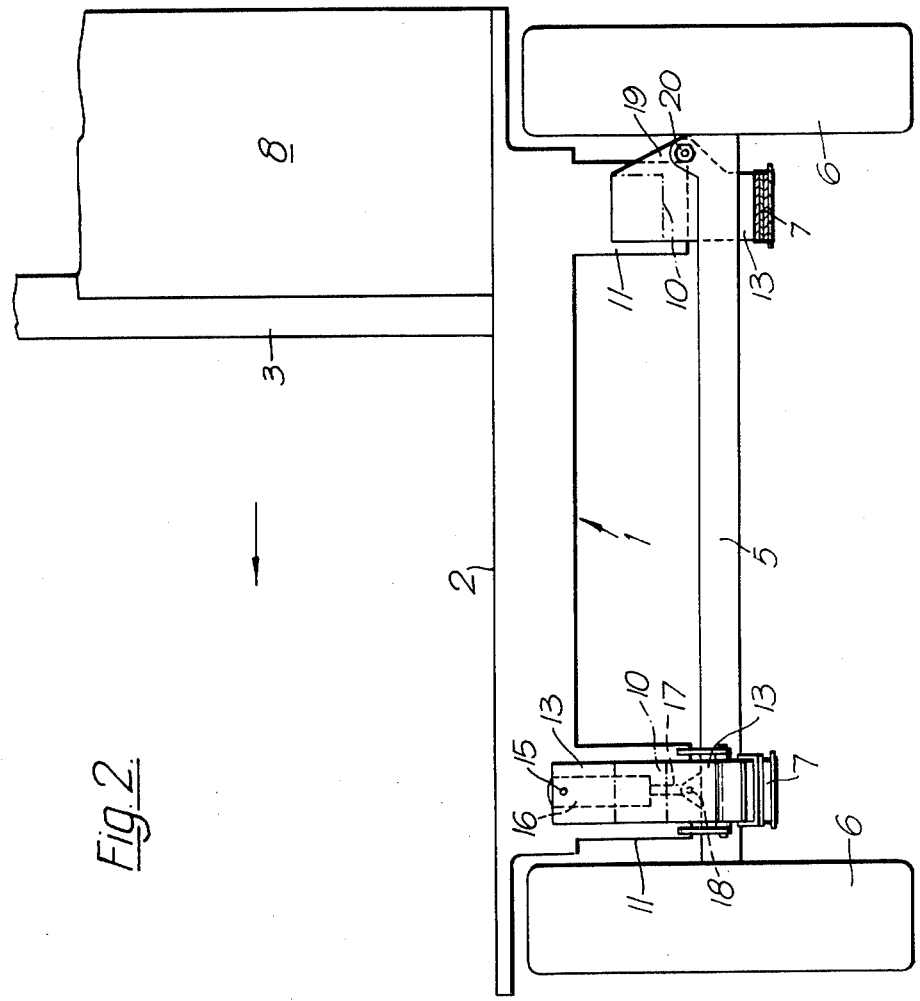

SUSPENSION SYSTEMS FOR VEHICLES

This invention relates to suspension systems for vehicles, in particular for side loading fork lift trucks.

A side loading fork lift truck has a load carrying deck transversely divided into two parts between which a lifting mast and forks are mounted for transverse travel. When a load is lifted on the forks at the loading side of the truck, the chassis and lifting mast tend to tilt towards that side.

To compensate for such tilting, it is known to mount the chassis on the axles of the truck by means of pivoted connections at one side of the truck and hydraulic rams at the opposite, or loading, side of the truck.

Hitherto, the arrangement last referred to has been embodied only in side loading fork lift trucks having un-sprung suspension systems.

In a vehicle having a suspension system according to the invention, the vehicle having at least one axle and a ground engaging wheel at each end of the axle, there is provided a suspension unit having:

(1) a sub-frame for each end of the axle; the sub-frame associated with one end of the axle being coupled to the axle by a pivotable connection; the sub-frame associated with the other end of the axle being coupled to the axle by way of a strut whose length can be varied.

(2) a main suspension spring resiliently coupling each sub-frame to the chassis; and (3) an elastomeric spring interposed between each sub-frame and the chassis.

Typically in such a vehicle there are provided a plurality of axles, each with one of the suspension units, the units being disposed so that all the sub-frames coupled to each axle by way of a pivotable connection be on one side of the vehicle; and all the sub-frames coupled to the axle by way of a strut whose length can be varied, be on the other side of the vehicle.

When the struts are operated to tilt the chassis relative to the axles, the elastomeric springs remain in their compressed condition and the axles move relative to the sub-frames. Preferably, the main suspension springs comprise leaf springs.

A preferred embodiment of the invention will now be described, by way of example, with reference to the accompanying drawings in which:

FIG. 1 is a schematic side elevation of a side loading fork lift truck incorporating a suspension system according to the invention; and FIG. 2 is a schematic end elevation of the vehicle shown in FIG. 1.

Referring to the drawings, the general structure of the preferred truck comprises: a chassis 1 having a load carrying deck 2 transversely divided into two parts; a lifting mast 3 carrying lifting forks 4 and mounted for transverse travel on the chassis 1 between the two parts of the deck 2; a pair of axles 5 carrying wheels 6; and leaf springs 7 connected to the chassis 1. A driving cab 8 and power unit 9 are mounted, as shown, on the chassis 1.

Located between the chassis 1 and the axles 5 are elastomeric springs 10 which are bonded, on the one hand, to bearer portions 11 of the chassis 1, and on the other hand, to sub-frame 12. Each of the two sub-frames 12 at the loading side of the truck (shown in elevation in FIG. 1) includes a pair of parallel, spaced-apart plates 13 which are secured at their bottom ends to a respective one of the leaf springs 7 and extend upwardly through openings 14 in the chassis bearer portions 11. Mounted between each pair of plates 13, by means of pivoted connections 15, are the cylinders of hydraulic rams 16, the piston rods 17 whereof extend downwardly and are coupled at their ends to the respective axles 5, by means of pivoted connections 18. The axles 5 are slidable in a vertical plane between the plates 13 upon the actuation of rams 16.

Each of the other two sub-frames 12 at the opposite, or cab, side of the truck (shown only in FIG. 2 of the drawings), includes a pair of parallel spaced-apart flange plates 19 which are directly coupled to the respective axle 5 that is located between them, by a pivoted connection 20. At their bottom ends the plates 19 are secured to respective ones of the springs 7.

Normally the rams 16 at the loading side of the truck are retracted and the loading deck 2 is parallel to the axles 5, as illustrated; in this condition, as in the tilted condition, the chassis 1 is supported on the axles 5 at the loading side of the truck by the rams 16.

When the rams 16 are extended they act, through their pivoted connections 15 and 18 with the sub-frames 12 and axles 5, respectively, so as to tilt the chassis 1 about the axis of the pivoted connections 20 at the opposite, or cab, side of the truck. The deck 2, lifting mast 3 and forks 4, tilt accordingly in the direction of the arrow shown in FIG. 2.

The hydraulic circuitry for operating and controlling the tilting rams 16 is conventional and is not, therefore, described herein.

In an alternative embodiment of the invention not specifically described herein, the chassis is pivoted at the lifting side of the truck and the tilting rams are located at the cab side of the truck.

What is claimed is:

1. A vehicle having a suspension system for a chassis of the vehicle, the vehicle having at least one axle and a ground engaging wheel at each end of the axle, comprising a suspension unit having:

(1) a sub-frame for each end of the axle; the sub-frame associated with one end of the axle being coupled to the axle by a pivotable connection; the sub-frame associated with the other end of the axle being coupled to the axle by way of a strut whose length can be varied;

(2) a main suspension spring resiliently coupling each sub-frame to the chassis; and (3) an elastomeric spring interposed between each sub-frame and the chassis.

2. A vehicle as claimed in claim 1 having a plurality of axles, each with one of the suspension units, the units being disposed so that all the sub-frames coupled to each axle by way of a pivotable connection be on one side of the vehicle; and all the sub-frames coupled to the axle by way of a strut whose length can be varied be on the other side of the vehicle.

3. A vehicle as claimed in claim 1 wherein the main suspension spring comprises a leaf spring having its ends coupled to the chassis and its centre coupled to the sub-frame.

4. A vehicle as claimed in claim 1 wherein the strut comprises a hydraulically powered ram.

5. A vehicle as claimed in claim 2 wherein the chassis is provided with a drivers cab on that side of the chassis on which lie the sub-frames coupled to each axle by way of the pivotable connection.

6. A vehicle as claimed in claim 2 wherein the chassis is provided with a drivers cab on that side of the chassis on which lie the sub-frames coupled to each axle by way of the strut whose length can be varied.

7. A vehicle as claimed in claim 5 wherein the strut is operable from the drivers cab.

8. A vehicle as claimed in claim 6 wherein the strut is operable from the drivers cab.

9. A vehicle as claimed in claim 2 having a load carrying deck running transverse to the axles and divided into two parts and a lifting mast with lifting forks disposed between the two parts and mounted for lateral travel on the chassis.

* * * * *